Oct. 21, 1958 F. J. SINGER 2,857,464

CARRIER OPERATION OF MULTISTATION TELEPHONE LINES

Filed Aug. 16, 1954 3 Sheets-Sheet 1

INVENTOR
F. J. SINGER
BY A. J. Kane
ATTORNEY

CARRIER OPERATION OF MULTISTATION TELEPHONE LINES

Filed Aug. 16, 1954 3 Sheets-Sheet 2

INVENTOR
F. J. SINGER
BY
A. J. Kane
ATTORNEY

CARRIER OPERATION OF MULTISTATION TELEPHONE LINES

Filed Aug. 16, 1954 3 Sheets-Sheet 3

INVENTOR
F. J. SINGER
BY
A. J. Kane
ATTORNEY

United States Patent Office 2,857,464
Patented Oct. 21, 1958

2,857,464

CARRIER OPERATION OF MULTISTATION TELEPHONE LINES

Fred J. Singer, Rockville Centre, N. Y., assignor to Bell Telephone Laboratories, Incorporated, New York, N. Y., a corporation of New York Application August 16, 1954, Serial No. 450,002

9 Claims. (Cl. 179—15)

This invention relates to telephone systems and particularly to party line systems of communication in which a plurality of subscriber stations located on the premises of different telephone subscribers are connected to a central office by way of a single line circuit.

Party line telephone systems are well known in the communication art and the economic advantages of systems involving multiparty line operation are equally well known. It is also well known that while the economic advantages of such systems are substantial, the quality of service afforded thereby is something less than that which characterizes telephone systems which operate on a single party line basis.

It is one object of this invention to provide an improved system of telephone communication which combines the economic advantages of multiparty line operation with the quality of service now available to single party line subscribers.

This object is attained in accordance with a particular feature of the invention by operating a telephone station line on a so-called "carrier" plan. More particularly, a single two-wire telephone line extending between a central office and a plurality of subscribers' premises is provided with line-terminating carrier equipment at each of a group of subscriber stations, and with corresponding terminating carrier equipment at the central office, whereby the physical line is rendered capable of simultaneous use by all the subscribers and of carrying a plurality of simultaneous two-way conversations on a complete privacy basis.

In accordance with another feature of the invention the carrier equipment terminating the physical line at each of the subscriber stations includes amplifiers, oscillators, modulators and demodulators all powered from a power source located at the central office, over the line conductors which constitute the speech path between the subscribers' premises and the central office.

A further feature of the invention contemplates the use of amplifiers, oscillators, modulators and demodulators of the three-electrode semiconductor, or transsistor type in the line terminations at the subscriber stations and at the central office. Such elements operate on relatively low voltages; require no heater power to enable them; are of small size and economical construction; and are further characterized by low-current consumption and long life of service.

Figure 1:
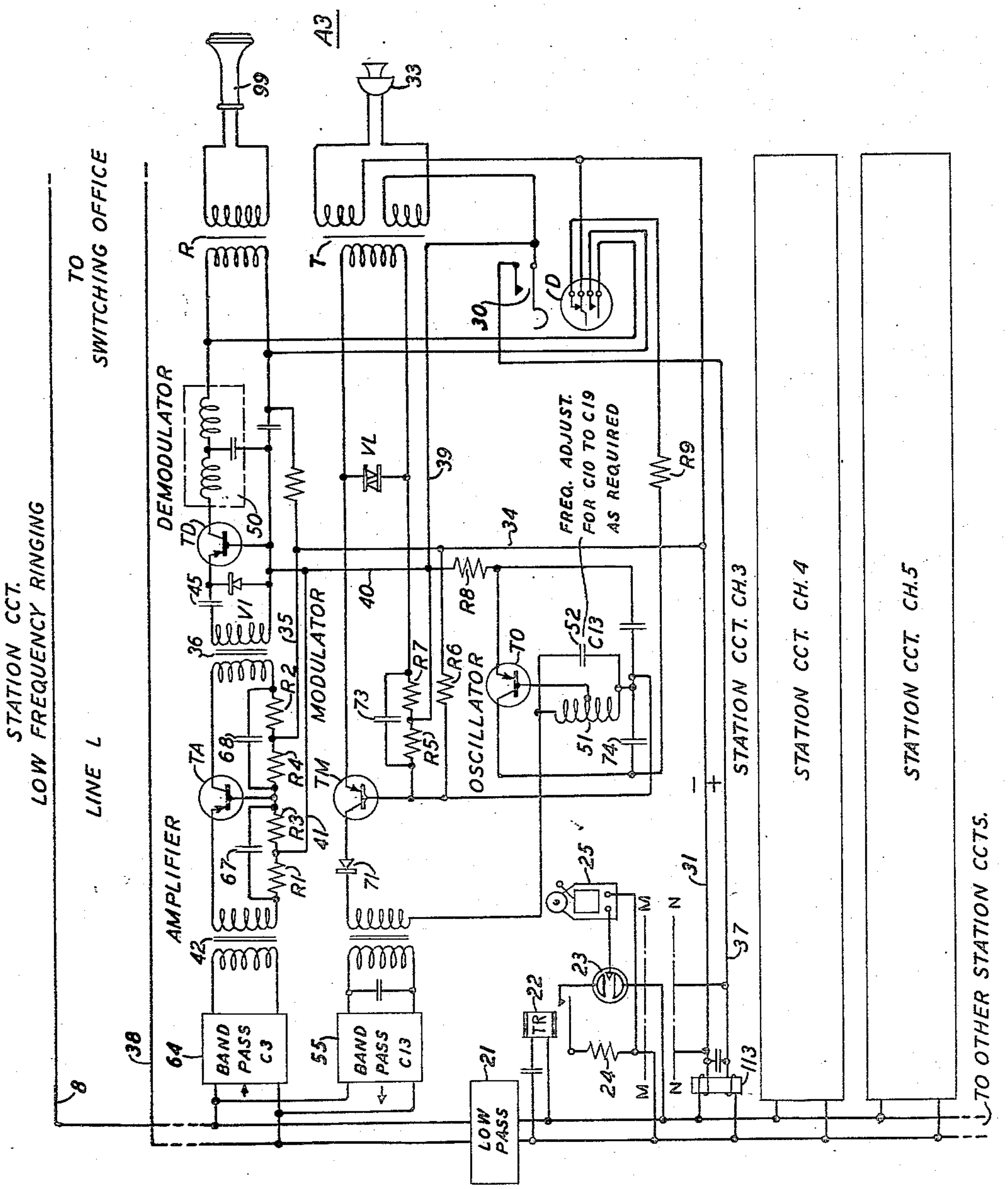
Figure 2:
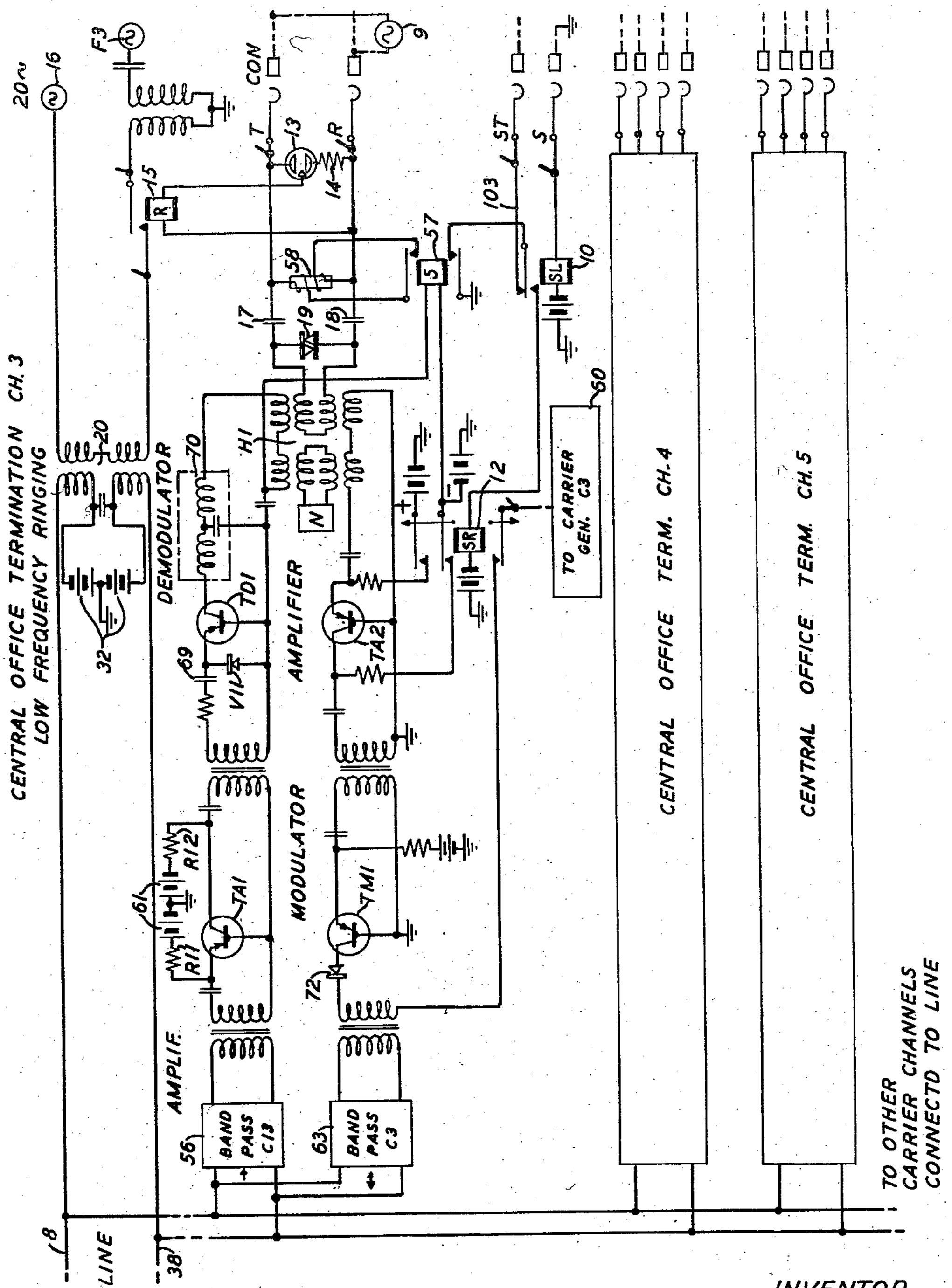
Figures 3, 4:
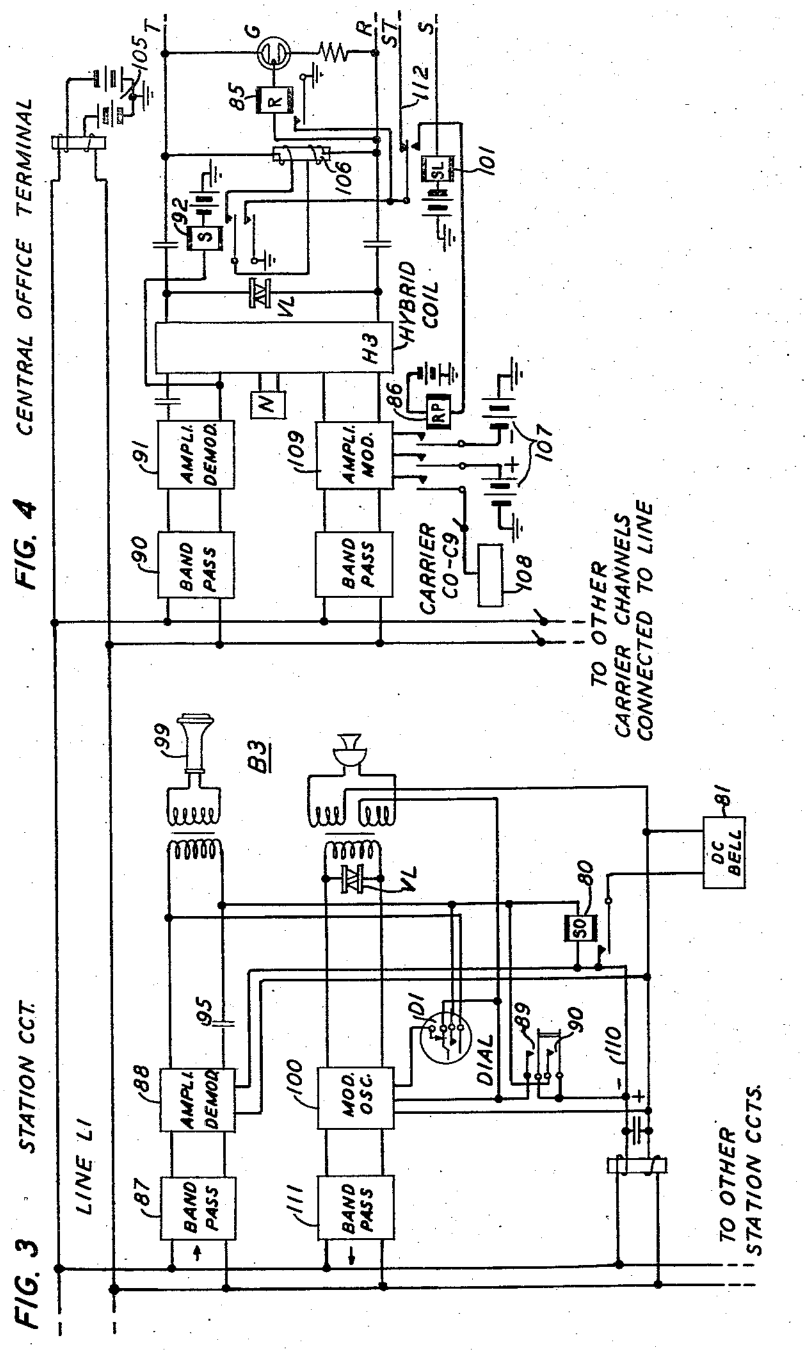

These and other features of the invention will be readily understood from the following detailed description when read with reference to the accompanying drawings, in which:

Fig. 1 is a circuit diagram showing, in detail, the station termination of a carrier channel involving features of the invention; other station terminations are indicated by block diagrams;

Fig. 2 is a circuit diagram showing, in detail, the central office termination corresponding to the station termination shown in detail in Fig. 1; other central office line terminations are indicated by block diagrams; and Figs. 3 and 4 correspond generally to Figs. 1 and 2, respectively, and illustrate a comparable system of communication in which current other than 20-cycle ringing current is used for signaling purposes.

In accordance with the general characteristics of the system disclosed in the drawings, a pair of carrier frequencies with double sidebands are assigned to each subscriber having access to the physical line L, one frequency being used to transmit speech and signals from the subscriber station, and the other frequency being used for transmitting from the central office. For example, and assuming a ten station line, carrier frequencies C0 to C9 are transmitted from the central office on channels CH0 to CH9, respectively, while carrier frequencies C10 to C19 are used in the opposite direction. In the system shown in Figs. 1 and 2, ten low frequencies F0 to F9 are used for ringing the subscribers, one frequency per subscriber. These low frequencies may be chosen from 200 cycles to 400 cycles and correspondingly tuned reed relays are used at the stations for their reception. Each physical line L, in accordance with the present invention and as disclosed particularly in Fig. 2, has ten terminal appearances in the central office, one for each subscriber station served by the line. Each subscriber station circuit, in a manual system, would appear in the central office on a separate switchboard jack, and in an automatic, or dial system, in the usual automatic switch terminals as shown in Fig. 2.

Referring now to Fig. 1 and Fig. 2, with Fig. 2 placed to the right of Fig. 1, the disclosed circuit operates in the following manner:

*Terminating call*

On a call incoming to a subscriber station, such as station A3 on channel CH3 for example, the channel CH3 which is individual to station A3, if idle, is seized at the central office by the connector CON in well-known manner, and 20-cycle ringing current is applied from source 9 to the tip and ring conductors thereof. Ground on the sleeve terminal of the connector operates relay 10 in an obvious circuit. Relay 10, at its armature and front contacts, prepares an operating path for the later operation of relay 12.

Each outgoing 20-cycle ring from the source 9 in the central office breaks down gas tube 13, which is connected across the central office end of channel CH3 in series with resistor 14, thereby causing relay 15 to operate on the 20-cycle ringing current.

Relay 15, operated, connects both the 20-cycle ringing source 16 and the low frequency source F3, individual to channel CH3, to the physical line L. High amplitude ringing voltage is prevented from reaching the carrier termination equipment at the central office by the impedance of condensers 17 and 18 to low frequency current and by the varistor bridge 19 which limits the tip and ring voltage.

Current from the source F3 traverses the conductors of the physical line L by way of repeating coil 20, thence through the low-pass filter 21 and through the winding of reed-type relay 22. Relay 22 is tuned to the frequency of the current from source F3 and operates.

Relay 22, at its armature and front contact, bridges the line L with the gas tube 23 and the serially connected resistance 24, whereupon the gas in tube 23 is ionized by the 20-cycle ringing voltage from source 16 to complete the connection of ringer 25 to the line. The ringer 25 thereupon operates on the 20-cycle ringing current from source 16. It is to be noted that normal line voltage will not ionize the gas in tube 23.

Each of the other stations of the system is provided with a reed-type relay similar to relay 22 and tuned to some low frequency other than the frequency of the current from source F3. Such other relays, therefore, do not respond to current from this source.

In response to the operation of the ringer or audible signal device 25, the subscriber at station A3 removes the receiver from its switchhook and, in so doing, causes the switchhook contacts 30 to be closed. With contacts 30 closed at the subscriber station, direct-current line battery from the central office source 32 is connected to the transistor oscillator TO, the transistor amplifier TA, the transistor demodulator TD, and the transmitter 33, all at the subscriber station A3.

The transistor amplifier TA requires constant current rather than constant voltage power supply. Substantially constant current to the amplifier is provided to the emitter element thereof by way of resistor R1, and to the collector element thereof by way of resistor R2. Transistor TA, as well as all transistors shown in Figs. 1 and 2, are of the point contact N-type units which require negative potential on the collector terminal and positive bias on the emitter terminal. The circuit to the collector element of amplifier TA may be traced from the negative terminal of central office battery 32, the upper left winding of repeating coil 20, line conductor 8, low-pass filter 21, upper winding of retardation coil 113, negative lead 31, over conductors 34 and 35, resistor R2 and the left winding of transformer 36, while the circuit to the emitter element is traced from the positive terminal of central office battery 32, lower left winding of repeating coil 20, line conductor 38, low-pass filter 21, lower winding of retardation coil 113, positive lead 37, thence over switchhook contacts 30, conductors 39, 40 and 41, resistor R1, and the right winding of transformer 42.

The demodulator TD is operated with zero emitter bias. Emitter and collector current under this condition is very low in the absence of carrier. Negative half cycles of the incoming modulated carrier cause current to flow through varistor V1 to charge condenser 45, the charge being proportional to the level of the incoming signal. On the following positive half cycles, the condenser 45 is discharged through the emitter element of the transistor demodulator. The resulting emitter current causes the flow of collector current. The collector current consists of a carrier frequency component which is suppressed by the low-pass network 50; the envelope frequency, which is the desired voice frequency; and a direct-current component.

The transistor oscillator TO is an amplifier with tuned positive feedback due to the presence, in the base circuit of the transistor, of the inductance-capacity network, consisting of coil 51 and condenser 52, which is tuned to the desired carrier frequency which, in the present instance, is identified as carrier frequency C13. This network is also used as a tank circuit from which the carrier supply for the modulator TM is obtained. Impedance adjustments for the oscillator and for the output of the demodulator are provided by properly tapping the coil 51 of the tuned circuit. Resistors R8 and R9 provide constant current for the emitter and collector elements of the oscillator TO. Power to the collector element of oscillator TO is supplied through the pulsing contact of the dial D.

When power is supplied to the carrier oscillator TO incident to the removal of the receiver at station A3 from its support and the consequent closure of contacts 30, the carrier frequency C13 of the oscillator TO passes through the modulator TM, the band-pass filter 55 which is designed to pass this frequency together with its sideband frequencies, and thence over the line L to the central office. There it passes through a similar band-pass filter 56, through the transistor amplifier TA1 and the demodulator TD1 where it is demodulated. Since voice frequencies are not yet present on the line, the output of the demodulator TD1 consists of direct current only, which causes relay 57 to operate.

At its upper armature and front contact, relay 57 connects coil 58 in bridge of the tip and ring conductors extending to the connector switch and to the established connection, thus simulating the subscriber's response on a normal subscriber line and therefore tripping the incoming ringing current in well-known manner.

Removal of 20-cycle ringing current source 9 from the connection releases relay 15 which disconnects the 20-cycle source 16 and the low frequency source F3 from the line L, unless other relays 15 associated with other channels are operated at this time. The release of relay 15 terminates the ringing at the called station A3.

At its lower armature and front contact, relay 57 completes the operating circuit for relay 12 which relay thereupon operates. At its upper armature and front contact, relay 12 supplies direct-current power of the proper polarities to the emitter and collector elements of the amplifier TA2, and at its lower armature and front contact connects the carrier source 60 to the transistor modulator TM1. Direct-current power is normally connected to the emitter and collector elements of the incoming amplifier TA1 by way of resistors R11 and R12, respectively, from the battery 61.

The called station now is connected to the calling station for communication purposes and the subscribers may converse. The hybrid coil H1 in the line circuit at the central office provides a two to four wire coupling and also provides the necessary impedance transformation between the line and transistor circuits by the use of inequality ratio windings.

Speech signals incoming over the circuit connected to the tip and ring terminals of the connector CON traverse the hybrid coil H in well-known manner, are amplified by the transistor amplifier TA2, are superimposed on the carrier frequency from source 60 and modulated in TM1; thence they traverse the band-pass filter 63 which is tuned to pass the modulated carrier from source 60, and are transmitted over the line L and received at the subscriber station A3 by way of the band-pass filter 64, are amplified at TA, demodulated at TD and impressed on the input winding of transformer R and activate the receiver 99 in the usual manner.

Speech signals originating at the transmitter 33 of the subscriber station A3 traverse the transformer T, are superimposed on the carrier C13 generated by the oscillator TO, and then are modulated by the modulator TM; the modulated carrier then traverses the band-pass filter 55 and is transmitted over the line L to the central office, whence it passes through band-pass filter 56, is amplified in TA1, demodulated in TD1 and impressed on the upper windings of hybrid coil H1 and then transmitted over the established connection to the calling station.

The resistors R1 and R3 and resistors R2 and R4 at the subscriber's station by which the proper polarities for the transistor amplifier TA are supplied from a single source of potential, line battery 32 at the central office, are provided with necessary by-pass condensers 67 and 68, respectively.

As in the case of the demodulator TD at the subscriber's station, the negative half cycles of the modulated carrier transmitted from the subscriber's station cause current to flow through varistor V11 to charge the condenser 69, the charge being substantially proportional to the level of the transmitted signal. On the following positive half cycles, this condenser is discharged through the emitter. The resulting emitted current causes the flow of collector current consisting of the carrier frequency component which is suppressed by the low-pass network 70; the envelope frequency which is the desired voice frequency; and a direct-current component. The modulators TM and TM1 are transistor amplifiers with only carrier voltage supplied to the collectors thereof. Collector current flowing during negative half cycles is controlled by the signal emitter current. Because of the characteristic of the transistor, collector current due to positive collector voltage is uncontrolled, so that the varistors 71 and 72 are connected in series with the respective collectors to block this current during positive half cycles of the impressed carrier. Resistors R5 and R6 in Fig. 1, provide the necessary positive bias to the transistor TA. Resistor R7 changes the constant voltage bias to substantially constant current. The by-pass condenser 73 is provided for signal frequencies. The condenser 52 tunes the output coil of the modulator TM to the carrier frequency C13 thereby providing a tank circuit which is energized by pulses at the carrier frequency flowing in the collector circuit of the modulator.

At the termination of the conversation between the calling and called subscribers, the receiver is replaced on its support at station A3 causing the separation of contacts 30 and the consequent opening of the direct-current path between the station and the central office.

Termination of carrier C13 from oscillator TO causes relay 57 at the central office to release, thus opening the supervisory bridge 58 on the tip and ring conductors of the connection. Relay 12 thereupon releases, assuming relay 10 has not already released, returning the channel CH3 to normal idle condition. The opening of bridge 58 initiates the release of the atomatic switches in well-known manner.

Should the calling subscriber restore his receiver before the called subscriber does so, the consequent release of the atomatic switches would result in the removal of ground from the connector sleeve terminal to effect the release of relay 10 which, in turn, would cause relays 12 and 57 to release.

The use of 20-cycle ringing current on the line may be objectionable in that it would require a large retardation coil R (N wiring in Fig. 1) to prevent the low frequency from being impressed upon the transistor circuits through their power supply leads. If the direct-current line voltage is high enough to permit the gas tube 23 to be broken down when relay 22 operates, the optional wiring N and a direct-current bell may be used. The use of 20-cycle ringing current, therefore, would be obviated.

Another method of ringing, which also does not require 20-cycle ringing current, is shown in Figs. 3 and 4. The tuned reed alternating-current relay 22 of Fig. 1 is replaced by a direct-current relay 80 and a direct-current bell 81 is used. Operation of the system shown in Figs. 3 and 4 is the same as that of the system shown in Figs. 1 and 2 except for the ringing.

On a terminating call, 20-cycle ringing current from the central office switching equipment operates relay 85, Fig. 4, in the same manner in which relay 15 operates, as previously described. However, the contacts of relay 85 complete a circuit for relay 86 by way of the armature and front contacts of relay 101 which relay operates and performs the same functions as relay 12 of Fig. 2, one of which is to cause the carrier from C0—C9 to be transmitted over the line L. This carrier, when received and demodulated by means of the band-pass filter 87 and amplifier-demodulator 88 produces direct current to operate relay 80.

Relay 80, operated, causes the direct-current bell 81 to be connected across the line and to be rung. This bell, therefore, follows the normal pattern of 20-cycle ringing from the central office until the called subscriber answers by removing the receiver 88 from its support and thereby causing the operation of switchhook contacts 89 and 90.

Switchhook contacts 90, when closed, shunt-down relay 80, which releases and silences the bell 81.

Switchhook contacts 89 complete the connection of the modulator-oscillator 100 to the line L so that these devices are enabled and the oscillator functions to generate the carrier C13 as in the previously described case. The carrier then traverses band-pass filter 111 and the line L; is received at the central office by way of the band-pass filter 90 and the amplifier-demodulator 91. Without the presence of voice on the line, the direct-current component of the transmitted frequency appears at the demodulator output and causes relay 92 to operate and to perform functions similar to those performed by relay 57 of Fig. 2.

At the termination of conversation on line L, the subscriber at the called station, Fig. 3, may hang up the receiver before the calling party disconnects. If so, relay 80 at the subscriber station starts to operate as soon as the short circuit on its winding is removed, which occurs incident to the reopening of switchhook contacts 90. However, hanging up of the receiver also opens contacts 89 which results in terminating the transmission of carrier from the called station, thereby allowing relay 92 and relay 86 at the central office to release, thus terminating the transmission of carrier to the station. Relay 80 thereupon is deprived of operating current and will release. By making relay 80 slow-to-release, it will not operate when the receiver is restored to its support. The presence of condenser 95 will increase the operate time of relay 80.

It will be noted that in this embodiment, power is continuously supplied to the incoming amplifier-demodulator 88 in the station circuit. The current drain should be low in order to minimize voltage drop in the line since a number of stations are connected to the same line.

While the use of normal current supply to the transmitter at the subscriber's station, as described, would provide high level speech current to the modulator without intermediate amplification, such current drains might be undesirable when several subscribers are served simultaneously by the line L thereby producing excessive voltage drop. Much lower values of transmitter currents may be resorted to as gain is introduced. Such gain may be added by the insertion of an amplifier such as amplifier TA of Fig. 1.

*Originating call*

On a call originating at one of the subscriber stations, such as station A3, the receiver 99 is removed from its support causing the closure of switchhook contacts 30. As in the case of the terminating call previously described, closure of the switchhook contacts 30 causes power from the central office direct-current source 32 to be connected to the transistor circuits of the amplifier TA, demodulator TD, oscillator TO and modulator TM, and also to the transmitter 33.

The oscillator TO then functions to generate the carrier frequency C13 which is transmitted to the line L by way of modulator TM and band-pass filter 55, thence over the line L, and is received at the central office by way of band-pass filter 56, is amplified in the amplifier TA1 and demodulated in the demodulator TD1. The direct-current component of the demodulator output causes relay 57 to operate.

At its upper armature and front contact, relay 57 connects a bridge comprising the windings of retardation coil 58 across the tip and ring conductors extending to the central office switches. At its lower armature and front contact relay 57 connects ground to the start lead 103.

The connection proceeds in the usual manner, encountering a line finder which results in the application of ground to the sleeve lead and resulting in the operation of relay 10. A circuit for relay 12 is now completed and relay 12 operates to perform those functions ascribed to it in the preceding description.

Dial tone is returned over the connection in well-known manner from the central office switching equipment to the subscriber at station A3. The subscriber then proceeds to dial the number of the desired party.

The pulsing contacts of dial D at substation A3 are included in the power circuit to the collector element of the transistor-oscillator TO so that, as the dial is operated, the output of the oscillator is interrupted in accordance with the digits dialed by a calling subscriber. Thus, the direct-current output of the demodulator TD1 at the central office is correspondingly interrupted at the dialing rate to pulse relay 57. Relay 57 therefore repeats the pulses over the loop into the switching equipment at the central office which thereupon functions in well-known manner to complete the desired connection. Relay 12 tends to follow the operation of relay 57 but is made slow-to-release so as to hold operated during pulsing. This characteristic of relay 12 precludes the possibility of the outgoing carrier from source 60 being pulsed and causing disturbances in the calling subscriber's receiver. As a further precaution, the off-normal contacts of dial D function to short-circuit the receiver 99 during the dialing operation.

With respect to Figs. 3 and 4, a call originated at the substation B3 follows the steps just described in connection with a call originated at station A3 of Fig. 1. Briefly, the removal of the receiver 99 from its support at substation B3 results in the closure of switchhook contacts 89 and 90 and the consequent enabling of the amplifier-demodulator 88 and the modulator-oscillator 100 from the central office battery 105. The carrier generated by the oscillator at substation B3 traverses the band-pass filter 111, the line L1, band-pass filter 90, amplifier-demodulator 91 and thence the tip and ring conductors at the central office by way of the hybrid coil H3. The direct-current component of the demodulator output causes relay 92 to operate, which relay, at its inner armature and front contact, connects the bridge 106 across the central office line and ground potential at its outer armature and front contact to the start lead 112 to initiate the operation of the central office switching equipment in well-known manner. The consequent seizure of the calling line by the line finder at the central office results in the operation of relay 101 and the subsequent connection of dial tone to the line as is well known. Relay 101 completes the operating circuit prepared at the lower aramture and front contact of relay 92, to relay 86. Relay 86 operates connecting the direct-current source 107 and the carrier source 108 to the amplifier-modulator 109.

Upon receipt of dial tone the calling subscriber actuates the dial D1 whereupon the connection of the oscillator to the negative lead 110 is interrupted in accordance with the digits dialed by the subscriber. The modulator output is similarly interrupted as is also the direct-current component of the output of the demodulator 91 with the result that relay 92 follows the dial pulses and, through the consequent interruptions of the bridge 106, repeats the pulses into the switching equipment at the central office to operate the automatic switches accordingly and in well-known manner.

It is not deemed necessary to elaborate further upon the operation of the circuits of Figs. 3 and 4 since it conforms generally to that of the circuits of Figs. 1 and 2 previously described.

What is claimed is:

1. In a telephone system, a central office, a plurality of subscriber stations, a two wire line extending from said central office and terminating at each of said stations in a pair of carrier frequency channels, each channel of each of said pairs including at least one transistor type device having a collector element and an emitter element, the former requiring potential of one polarity and the latter potential of the opposite polarity for the enabling of the corresponding device, a battery at said central office, means including one of the wires of said line connecting the collector element of the said one transistor device to one terminal of said battery, and switchhook controlled means at each station for connecting the emitter element of the said one device to the other terminal of the said battery by way of the other wire of said line.

2. In a telephone system, a central office, a plurality of substations, a two wire line extending from said central office and terminating at each of said substations in signal receiving and transmitting channels, means including a transistor type amplifier and a transistor type demodulator in each of the signalling receiving channels responsive to signals transmitted over said line from said central office, said amplifier and said demodulator each including a collector element and an emitter element, a source of direct current at said central office, and switchhook controlled means at each of said stations for completing a circuit from said source of direct-current to the collector and emitter elements of said amplifier and said demodulator by way of the conductors of said two wire line.

3. In a telephone system, a central office, a plurality of subscriber stations, a two conductor telephone line, means terminating said line at each of said stations, comprising a carrier channel including means for generating a carrier frequency and for modulating the same in accordance with voice frequencies for transmission from the station to the central office and for amplifying and demodulating the modulated carrier frequencies transmitted from the central office to the station, each of said generating, modulating, demodulating and amplifying means comprising a three-electrode semiconductor device including emitter and collector elements requiring negative and positive potentials, respectively, for their operation, a source of negative potential at said central office, a source of positive potential at said central office and means including switchhook contacts at any of said stations for connecting the emitter elements of said devices to said source of negative potential by way of one of the conductors of said line and the collector elements of said devices to said source of positive potential by way of the other conductor of said line.

4. In a telephone system, a central office, a subscriber station, a telephone line interconnecting said central office and said subscriber station, means at said station for generating a carrier frequency, said means including a three-electrode semiconductor type oscillator having an emitter and a collector, a dial at said station, a source of direct current at said central office, means including switchhook contacts at said station for applying positive potential from said source by way of one conductor of said line to the emitter of said oscillator and negative potential from said source by way of another conductor of said line to the collector of said oscillator whereby said oscillator is enabled to generate the said carrier frequency for transmission over said line to said central office, means controlled by said dial for interrupting the connection of negative potential to the said collector element of said oscillator in accordance with a predetermined pattern whereby the generated carrier frequency is correspondingly interrupted, means at said central office for translating the carrier interruptions into switch-controlling pulses, and automatic switches at said central office responsive to the said switch-controlling pulses.

5. In a multiparty telephone system, a central office, a plurality of subscriber stations, a single pair of wires connecting said central office with said stations, a carrier frequency channel terminating said single pair of wires at each of said stations, a dial at each said station including pulsing contacts, a source of direct-current power at said central office, a transistor type oscillator in the carrier channel at each of said stations including collector and emitter elements, means at each station for including the collector and emitter elements of the associated oscillator in circuit with said source of direct-current by way of the two wires of said single pair of wires, whereby a carrier current of predetermined frequency is generated and transmitted over said wires to said central office, and means including the pulsing contacts of said dial for interrupting the circuit of said source of direct current to said oscillator whereby the output of said oscillator is interrupted in accordance with the operation of said dial.

6. A multiparty telephone system comprising a plurality of carrier channels superposed on a single pair of wires interconnecting said central office and a plurality of subscriber stations, means including a transistor oscillator at each of said stations for generating a carrier current of predetermined frequency, a source of direct current at said central office, and means at each station for connecting the associated transistor oscillator to said source of direct current by way of the wires of said single pair of wires whereby said oscillator is enabled and generates a carrier current of the said predetermined frequency for transmission over said wires to said central office.

7. In a multiparty telephone system, a central office, a plurality of subscriber stations, a two wire line interconnecting said central office and said subscriber stations, a source of 20-cycle ringing current at said central office normally disconnected from said line, a source of low frequency current at said central office, means at said central office for generating a high frequency carrier current, means responsive to the seizure of said line at said central office for simultaneously transmitting currents from said 20-cycle ringing and said low frequency sources over said line, means comprising a relay at one station selectively responsive to the transmitted low frequency current, a signal device at the said one station responsive to 20-cycle ringing current, means controlled by said selectively responsive means for connecting said signal device to said line to effect its operation on current from said 20-cycle source, and means responsive to the removal of the receiver at said one station for connecting said high frequency carrier generating means at said central office to said line whereby the carrier generated thereby is modulated by speech signals transmitted over said line to said station.

8. A single line telephone system comprising a single line circuit, a plurality of subscriber stations connected to a central office through a plurality of carrier frequency channels superposed on said single line circuit, means at each of said stations for producing and transmitting over said circuit a carrier wave for signalling said central office, a source of direct current at said central office floating on said single line, means at said central office for generating a plurality of carrier frequencies for transmission over said single line, means at each of said stations responsive to a different one of the carrier frequencies generated at said central office for completing a signalling circuit at the corresponding station from said source of direct current and signal means in the completed signalling circuit responsive to current from said direct current source.

9. A multiparty telephone system comprising a plurality of communication channels superposed on a single two-wire physical line interconnecting a central office and a plurality of subscriber stations, a source of 20-cycle ringing current at said central office normally disconnected from said line, low-frequency current sources at said central office, means responsive to the seizure of said line at said central office for simultaneously connecting said 20-cycle ringing current source and one of said low-frequency sources to said line for simultaneous transmission thereover, means comprising a tuned relay at one of said stations selectively responsive to the transmitted low-frequency current, a signal device at said station selectively responsive to 20-cycle ringing current, and means controlled by said tuned relay for connecting said signal device to said line for operation by current from the central office source of 20-cycle ringing current.

References Cited in the file of this patent

UNITED STATES PATENTS

| | | |
|---|---|---|
| 2,202,474 | Vroom | May 28, 1940 |
| 2,299,487 | Moore | Oct. 20, 1942 |
| 2,487,455 | Lesti | Nov. 8, 1949 |